Feb. 2, 1971 V. F. J. MARCOUX ET AL 3,559,337
APPARATUS FOR ELECTROCULTURE
Filed Feb. 18, 1969

INVENTORS
VERNON F. J. MARCOUX
STANLEY E. WOLF

BY *Kenyon, Palmer & Estabrook*

ATTORNEYS

United States Patent Office 3,559,337
Patented Feb. 2, 1971

3,559,337
APPARATUS FOR ELECTROCULTURE
Vernon F. J. Marcoux, 1617 Morgan Ave., Saskatoon, Saskatchewan, Canada, and Stanley E. Wolf, Box 116, Cutknife, Saskatchewan, Canada
Filed Feb. 18, 1969, Ser. No. 800,087
Int. Cl. A01m 21/00
U.S. Cl. 47—1.3                                    3 Claims

ABSTRACT OF THE DISCLOSURE

An apparatus for the destruction of vegetation by means of an electric arc is disclosed which takes the form of a vehicle having a plurality of pairs of electrodes mounted for simultaneous rotation on vertical axes so spaced from each other that an overlapping pattern is created. High voltage is connected between ground and each electrode to cause an arc discharge as the vehicle is moved over ground and as the electrode pairs are rotated.

BACKGROUND OF THE INVENTION

The destruction of undesired vegetation and even insect infestation in the ground or on plants through the use of electric arcs has a fairly long history. One of the earliest showings of this idea may be found in the patent to Roe No. 1,737,866 of 1929. The problem which has been encountered in commercial application of this broad principle is that of providing an apparatus which will produce a pattern of arc discharges which effectively completely covers a field over which a vehicle carrying such apparatus is caused to move. In other words, it is desirable to provide a vehicle-carried apparatus which when the vehicle is operated as are planters, for example, in planting a field which will be effective to create a pattern of electrical discharges which completely covers the area traversed by the vehicle in order to minimize overlapping in different passes over a given area. Although electrical arc discharges have in the past proven to be very satisfactory for the elimination of undesired vegetation and insect infestation, the problem of coverage has heretofore prevented any substantial successful commercial utilization of this principle.

BRIEF SUMMARY OF THE INVENTION

In accordance with the present invention, a series of pairs of rotating electrodes are carried on a vehicle with the axes of the rotation of the different pairs being so spaced with respect to each other that an overlapping pattern is produced as the vehicle proceeds across a field.

BRIEF DESCRIPTION OF THE DRAWINGS

In the accompanying single sheet of drawings.

DETAILED DESCRIPTION OF THE INVENTION

Figure 1:
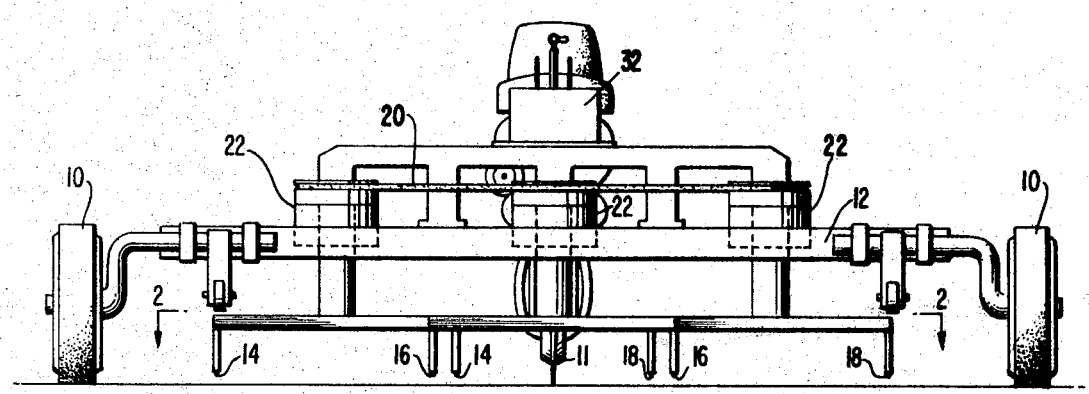
FIG. 1 is an end view of a vehicle carrying vegetation electrocution apparatus in accordance with the present invention.
Figure 2:
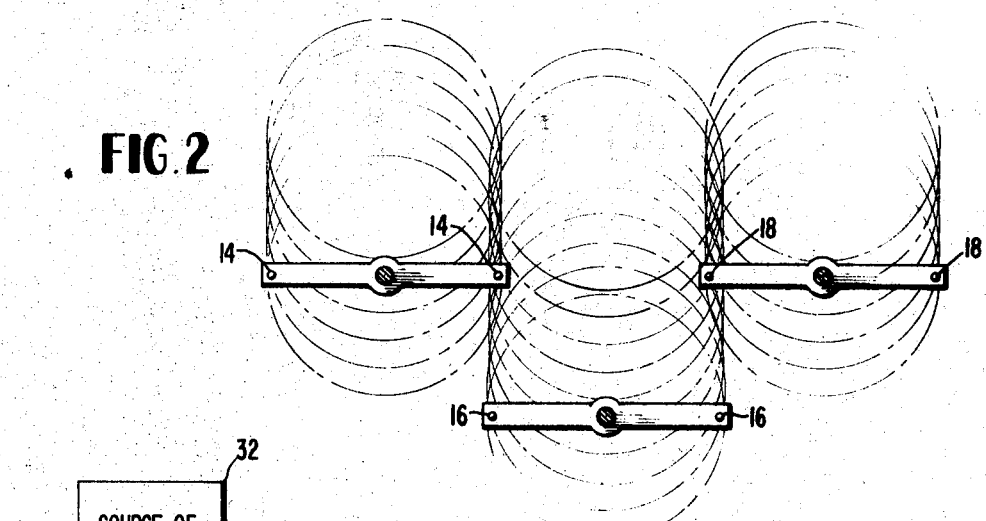
FIG. 2 is a schematic showing of the pattern produced by the rotation of the three pairs of electrodes shown in FIG. 1 and also indicating the relative spacing of the axes of the electrodes.

Since it is immaterial to the practice of the present invention what particular form of vehicle is employed to support the rotating electrode structure, the vehicle schematically shown in FIG. 1 is for illustrative purposes only and no detailed description thereof will be given except to say that it includes ground-engaging wheels such as shown at 10 and 11 and includes a framework 12 for supporting three pairs of rotatably mounted electrodes 14, 16 and 18. As will be apparent from FIGS. 1 and 2, the axes of rotation of the three pairs of electrodes are spaced from each other transversely of the vehicle by an amount sufficient to create an overlapping in the pattern as the three pairs are simultaneously rotated. In addition, the axis of pair 16 is spaced longitudinally of the vehicle so that there is no interference between the three pairs. While any known means could be employed for rotating the three pairs of electrodes on their axes, a belt and pulley arrangement 20 and 22 is indicated in FIG. 1 for this purpose.

Figure 3:
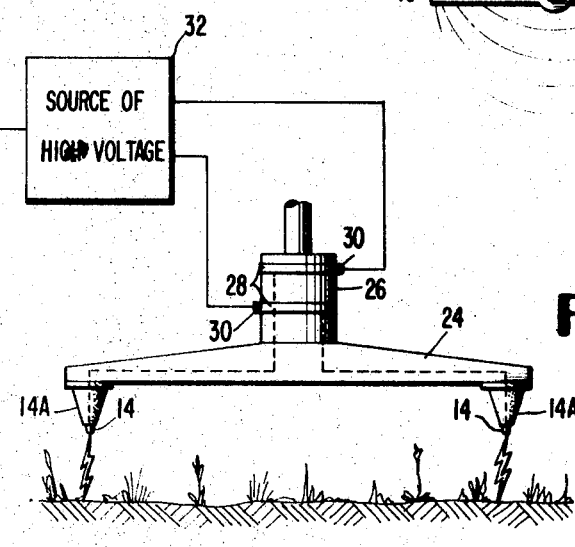
FIG. 3 is a detailed view of a preferred embodiment of one pair of electrodes showing the electrical connection thereto.

Referring now to FIG. 3 of the attached drawings, it will be seen that each electrode pair is mounted on an arm 24 rigidly supported on an insulating hub 26. Preferably the electrodes are carried on flexible rubber fingers 14A in order to avoid damage which would otherwise be caused by striking rocks or other obstructions. A pair of slip rings 28 carried on the hub are electrically connected to the electrodes respectively and thus provide a means for conducting high voltage electricity to the electrodes through brushes indicated at 30. It will be understood, of course, that a source of high voltage preferably carried by the vehicle has one terminal connected to ground, for example, through uninsulated ground engaging wheels of the vehicle such as shown at 11 in FIG. 1. A voltage source is schematically indicated at 32. The location of the source 32 if, of course, not critical and conceivably it could be mounted directly on the electrode structure.

From the foregoing, it is believed that it will be apparent to those skilled in this art that as the vehicle is propelled or towed over a field with the electrode pairs being driven in simultaneous rotation, that when a voltage sufficient to create an arc between the electrodes and ground is applied, that a thorough coverage of the area traversed by the vehicle is effected in order to completely destroy any undesired vegetation or insect infestation in a given area.

We claim:
1. Apparatus for destroying vegetation by electrical arc discharge comprising:
  (a) a vehicle supported on ground-engaging wheels;
  (b) a plurality of pairs of electrodes, each pair being mounted on said vehicle in spaced relation to the ground and to each other for rotation on vertical axes;
  (c) means for causing simultaneous rotation of said pairs of electrodes, the spacing between the axes of said electrode pairs being such that an overlapping path is created as said vehicle is moved over the ground and said pairs of electrodes are simultaneously rotated on their axes;
  (d) a source of high voltage carried by said vehicle;
  (e) and means operable during rotation of said electrode pairs for connecting said source of voltage be- tween ground and each of said electrodes to cause an arc discharge from each electrode to ground.

2. Apparatus as defined by claim 1 in which there are three pairs of electrodes, with the spacing transversely of the vehicle between adjacent pairs being less than the spacing between electrodes of each pair and the axis of the center pair being spaced longitudinally of the vehicle from the other two pairs.

3. Apparatus as defined by claim 1 in which each of said pairs of electrodes is resiliently mounted with respect to said vehicle.

References Cited

UNITED STATES PATENTS

| | | | |
|---|---|---|---|
| 779,791 | 1/1905 | Lokuciejewsky | 47—1.3 |
| 1,672,058 | 6/1928 | Cole | 47—1.5 |
| 2,968,354 | 1/1961 | Berry | 56—295UX |

ROBERT E. BAGWILL, Primary Examiner

U.S. Cl. X.R.

43—144; 126—271.1; 37—12, 16